Aug. 22, 1944.  J. P. GALTNEY  2,356,578
AXLE AND BEARING COOLER
Filed May 25, 1942
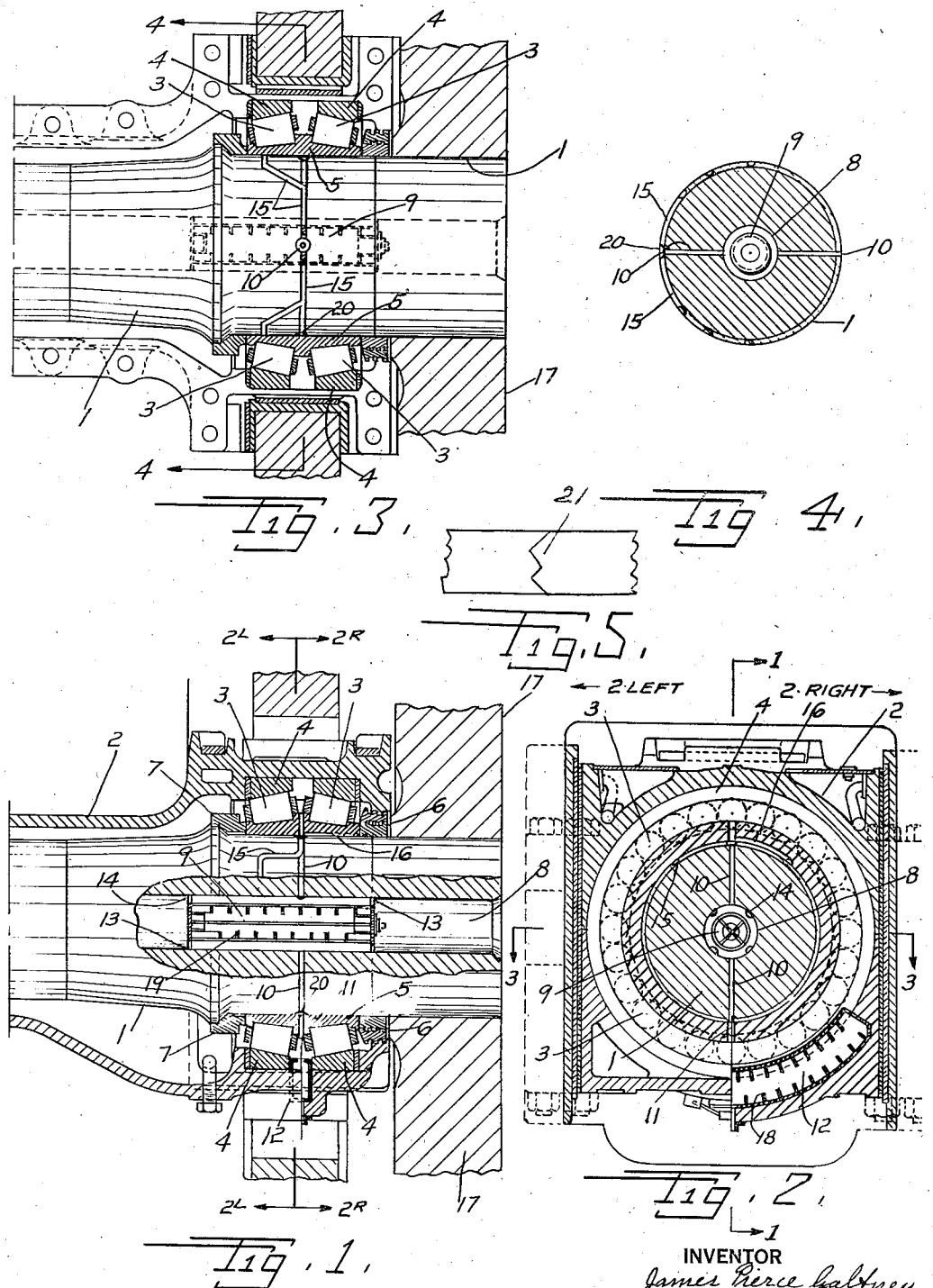
INVENTOR
James Pierce Galtney
BY
ATTORNEY Patented Aug. 22, 1944

2,356,578

UNITED STATES PATENT OFFICE 2,356,578

AXLE AND BEARING COOLER

James Pierce Galtney, Birmingham, Ala.

Application May 25, 1942, Serial No. 444,336

2 Claims. (Cl. 308—76)

This invention relates to axles and bearings and shafts and bearings, and has for its main object to provide means to keep an axle and bearing cool to avoid overheating and resulting damage. The device is especially designed and intended for use on railway locomotive axles where what is known as Timken roller bearings are used. This type of bearing is being used on locomotives very much at this time. It has been found that in many instances where such roller bearings are used on locomotive axles that terrific heat is generated at the point where the inner race of the bearing surrounds the axle, resulting in a crack around the entire circumference of the axle, thereby creating a highly dangerous condition. The present invention is for the purpose of overcoming such serious trouble.

Other objects and advantages will appear from the description and drawing.

By referring to the drawing, part of this application, it will be observed that Fig. 1 is a longitudinal sectional view of part of an axle housing adjacent a wheel, with hollow type axle partly cut out to center, with cooling device in section therein; Fig. 2 is a cross sectional view on line 2—2 of Fig. 1 showing right and left; Fig. 3 is a plan view in section showing bearing on axle; Fig. 4 is a sectional view of axle on line 4—4 of Fig. 3; Fig. 5 is part of a solid type axle with heat radiating groove in same.

Similar reference numerals refer to similar parts throughout the several views.

Again referring to the drawing it will be seen that there is an axle 1 mounted in a housing 2 carrying an assembled bearing comprising an inner race 5 that fits tightly on the axle 1, an outer race 4, with a plurality of rollers 3. The bearing assembly is held in place on the axle 1 by keepers 6 and 7 surrounding the axle. In the hollow type of axle shown in all the figures except Fig. 5, there is inserted a round oblong container 9 filled with a liquid known on the chemical market as "Aroclor." There are two kinds or grades. Aroclor #1248 is a complex mixture of chlorobiphenyls averaging about forty-eight percent chlorine and averaging a composition equivalent to tetrachloro biphenyl. Aroclor #1254 is a complex mixture of chlorinated biphenyls, averaging in analysis approximately pentachloro-biphenyls. These liquids will stand a temperature of between six hundred and six hundred and twenty-five degrees F. The liquid container 9 is less in diameter than the longitudinal hole 8 through the axle. The container is provided with a flange 13 at each end, the outer flange having a suitable screw plug. The outer flange is made oil tight but the inner flange is provided with openings 14 to allow passage of oil to the center portion of the hole through the axle. This hole provides a large reservoir for oil and provides additional radiation to keep the oil cool. Oil circulates all through the assembled bearing as it passes through the small holes 10 leading from the axle center large hole 8 to groove 20 that surrounds the axle. This groove is partly off-set as indicated by 15. The inner race 5 is also provided with an oil passageway 11 and 16 adjacent the axle 1. The container 9 is provided with internal fins 19 for radiation purposes.

On the solid type of axle the liquid container 12 is shaped like a quadrant and is placed in the bottom of the bearing housing containing the oil. This liquid container is also provided with fins 18. Part of a wheel 17 is shown mounted on end of axle. In Fig. 5 there is a zigzag groove 21 for heat radiation.

The assembled device keeps the oil cool by means of the liquid Aroclor in the container because the oil is caused to circulate when the axle and bearing are being revolved.

No claim is made as to the mixture known as Aroclor. It is a product of a well known chemical company. It is sold on the open chemical market. The novelty herein comprises the use of Aroclor as a cooling element in combination with the mechanical structure and features of the present invention. The device may be used on any axle or shaft and bearing where overheating is causing trouble; especially where roller bearings are being used.

While I have shown the preferred embodiment of my invention, I do not wish to limit myself to the precise and exact details of structure, but reserve the right to make any and all modifications and changes so long as I remain within the spirit and scope of the following claims.

Having described my invention I claim:

1. An axle and bearing cooling device comprising a cylinder set in a hollow in an axle and held in position by a flange at each end of said cylinder, said flanges being attached to the inner circumference of said hollow, space between the outer circumference face of said cylinder and the inner circumference face of said hollow; a fluid having a boiling point above six hundred degrees Fahrenheit contained in said cylinder, plug means in one end of said cylinder for inserting said fluid, lubricating oil in said space surrounding said cylinder, oil passageways leading from said hollow to the outer circumference of said axle, a groove that encircles said axle, said oil passageways leading into said groove, oil in said hollow disposed to circulate through said passageways and groove, said heat resisting fluid disposed to absorb the heat generated in said lubricating oil.

2. An axle and bearing cooling device comprising an axle having a hollow through its center along its major axis, an elongated round liquid container positioned in said hollow, a liquid having a boiling point above six hundred degrees Fahrenheit contained in said container; a plurality of oil passageways leading from said hollow adjacent said container to the outer circumference of said axle, a groove encircling said axle, said groove being in contact with said passageways.

JAMES PIERCE GALTNEY.